US012800398B2

(12) United States Patent
Krempel

(10) Patent No.: US 12,800,398 B2
(45) Date of Patent: Nov. 17, 2026

(54) CALIBRATION MECHANISM FOR THERMAL IMAGING SYSTEMS

(71) Applicant: OroraTech GmbH, Munich (DE)

(72) Inventor: Lucas Krempel, Munich (DE)

(73) Assignee: OroraTech GmbH, Munich (DE)

( * ) Notice: Subject to any disclaimer, the term of this patent is extended or adjusted under 35 U.S.C. 154(b) by 317 days.

(21) Appl. No.: 18/510,222

(22) Filed: Nov. 15, 2023

(65) Prior Publication Data

US 2024/0159594 A1 May 16, 2024

(30) Foreign Application Priority Data

Nov. 16, 2022 (LU) .................................. LU503071

(51) Int. Cl.
*G01J 5/061* (2022.01)
*G01J 5/06* (2022.01)
(Continued)

(52) U.S. Cl.
CPC ............... *G01J 5/061* (2013.01); *G01J 5/064* (2022.01); *G01J 5/0802* (2022.01);
(Continued)

(58) Field of Classification Search
CPC ...... G01J 5/0003; G01J 5/0014; G01J 5/0018; G01J 5/0022; G01J 5/0044; G01J 5/0066; G01J 5/007; G01J 2005/0074; G01J 2005/0077; G01J 5/0088; G01J 5/0096; G01J 5/02; G01J 5/0205; G01J 5/0215; G01J 5/0265; G01J 5/06; G01J 5/061; G01J 2005/062; G01J 2005/063; G01J 5/064; G01J 5/08; G01J 5/0801; G01J 5/0802; G01J 5/08021; G01J 5/0804; G01J 5/0805;
(Continued)

(56) References Cited

U.S. PATENT DOCUMENTS 5,436,457 A * 7/1995 Tomita ...................... G01J 3/10
250/343
5,811,811 A * 9/1998 Naya ..................... G01J 5/0805
250/339.04

(Continued)

*Primary Examiner* — Allen C. Ho
(74) *Attorney, Agent, or Firm* — Seed Intellectual Property Law Group LLP

(57) ABSTRACT

A method and an imaging system for providing an infrared image of an object comprises an optical element configured to capture infrared radiation from the object, an infrared sensing module, a processing unit, and a shutter assembly. The infrared sensing module comprises a plurality of infrared detectors, each configured to receive the infrared radiation from the object after passage through the optical element and generate a measurement signal from the received infrared radiation. The processing unit is coupled to the infrared sensing module and configured to convert the measurement signals into temperature data associated with the object for providing the infrared image. The shutter assembly is disposed between the infrared sensing module and the optical element, and is configured to selectively pass the infrared radiation from the object through to the infrared sensing module. The shutter assembly comprises a temperature controller configured to adjust a temperature of the shutter assembly.

37 Claims, 4 Drawing Sheets

(51) Int. Cl.

| | |
|---|---|
| ***G01J 5/08*** | (2022.01) |
| ***G01J 5/0802*** | (2022.01) |
| ***G01J 5/0804*** | (2022.01) |
| ***G01J 5/0805*** | (2022.01) |
| ***G01J 5/52*** | (2022.01) |
| ***G01J 5/70*** | (2022.01) |
| *G01J 5/00* | (2022.01) |
| *G01J 5/20* | (2006.01) |
| *G05B 11/42* | (2006.01) |

(52) U.S. Cl.
CPC ........... *G01J 5/0804* (2022.01); *G01J 5/0805* (2022.01); *G01J 5/0815* (2013.01); *G01J 5/52* (2013.01); *G01J 5/70* (2022.01); *G01J 2005/0077* (2013.01); *G01J 2005/063* (2013.01); *G01J 2005/202* (2013.01); *G05B 11/42* (2013.01)

(58) Field of Classification Search
CPC ...... G01J 5/0806; G01J 5/0808; G01J 5/0815; G01J 5/20; G01J 2005/202; G01J 5/70
USPC ........ 250/332, 338.1, 338.4, 339.01, 339.02, 250/339.03, 339.04
See application file for complete search history.

(56) References Cited

U.S. PATENT DOCUMENTS

| | | | | |
|---|---|---|---|---|
| 6,995,359 | B1 * | 2/2006 | Hillenbrand | G01J 5/0805 250/252.1 |
| 8,465,202 | B2 * | 6/2013 | Kaess | G01J 5/12 374/129 |
| 9,976,910 | B2 * | 5/2018 | Yagami | G01J 1/42 |
| 10,079,982 | B2 * | 9/2018 | Boulanger | H04N 23/23 |
| 10,375,327 | B2 * | 8/2019 | Kester | G01J 3/02 |
| 10,389,953 | B2 * | 8/2019 | Hoelter | H04N 17/002 |
| 10,965,889 | B2 * | 3/2021 | Stuart | G01J 5/025 |
| 10,996,542 | B2 * | 5/2021 | Kostrzewa | G03B 9/08 |
| 12,207,016 | B2 * | 1/2025 | Elmfors | G01J 5/064 |
| 12,352,620 | B2 * | 7/2025 | Isberg | G01J 5/53 |
| 12,385,786 | B2 * | 8/2025 | Kester | G01J 5/53 |
| 12,455,193 | B2 * | 10/2025 | Nguyen | G01J 5/064 |

* cited by examiner

400

CALIBRATION MECHANISM FOR THERMAL IMAGING SYSTEMS

BACKGROUND

Technical Field

This application relates to thermal imaging systems, and more particularly, to methods and apparatuses for calibrating thermal imaging systems.

Description of the Related Art

Infrared (IR) image sensors based on microbolometer arrays have been widely used for thermal imaging applications, as they provide excellent infrared thermal and spatial resolution. In particular, microbolometers can operate at room temperature (with at least some temperature stabilization) and do not require expensive cooling, which greatly reduces power consumption and allows compact design for imaging systems, such as IR cameras suitable for small satellites, for example.

However, since microbolometer arrays are not cooled, there may exist non-uniform responses of such microbolometer arrays to unit changes in IR radiation, which decreases measurement accuracy and also makes it difficult to repeat temperature measurement by simply comparing data obtained from one measurement to another measured at a different point in time. Therefore, calibrations may be carried out from time to time to compensate for the measurement errors. On the other hand, without further calibration the data can only represent relative changes in the image, which requires subsequent software processing for temperature estimations.

Notably, properties of a microbolometer detector may change due to forces during launch of the satellite, due to radiation over time, or due to changes in pixel response after the detector has looked into the sun. In space applications where responsivity of the pixels on a microbolometer array may vary depending on ambient temperatures (this may happen during eclipse or when being in the sun), camera calibrations need to be regularly performed. In general, this can also be sufficiently compensated directly via shutter calibration. So far this can only be achieved by installing extra components (such as flaps with blackbody emitters, for example) in front of the camera which can then be pushed into the camera's field of view. However, the use of extra components as blackbody sources for calibration requires additional space and in general can limit observation surface to be captured by the camera. Besides, performance depends strongly on the mechanical properties of the components (e.g., robustness). These drawbacks may reduce feasibility of such IR cameras for space applications.

Thus, there is a need for a simple calibration mechanism to be employed in compact thermal imaging systems, for example for space applications (e.g., IR imaging systems/cameras for small satellites). There is also a need for an improved calibration mechanism suitable for implementation in thermal imaging systems for obtaining accurate temperature measurements of an object.

BRIEF SUMMARY AND GENERAL DESCRIPTION

In view of these needs, the present application discloses apparatuses and methods for performing temperature measurements of an object by means of thermal imaging in which an infrared (IR) image of the object is created using infrared radiation emitted from the object. Infrared radiation (IR), also known as thermal radiation, includes radiation in the band of the electromagnetic radiation spectrum with wavelengths above red visible light between 780 nm and 1 mm. For example, IR may have a wavelength range of 780 nm-1.4 μm (IR-A), a wavelength range of 1.4-3 μm (IR-B), or a wavelength range of 3 μm-1 mm (far-IR). In general, infrared radiation from an object may be captured by an IR sensor (e.g., microbolometer) which will then produce measurement results (e.g., a temperature profile of the object) based on the infrared radiation. The disclosed apparatuses and methods particularly relate to calibration of such an IR sensor for temperature measurements of an object.

An aspect of the disclosure relates to an imaging system for providing an infrared image of an object. The imaging system may be, for example, a thermal/IR imaging system, such as an IR camera. The system may comprise an optical element and an infrared sensing module. The optical element may be or may comprise an optical lens, for example. The optical element may be an infrared optical element, for example. The optical element may be configured to capture infrared radiation from the object. The infrared sensing module (e.g., an IR sensor) may comprise a plurality of infrared detectors, such as an IR detector array. One example of an IR detector array may be a microbolometer comprising an array of pixels where each pixel may correspond to one of the plurality of infrared detectors. Thus, each of the infrared detectors may be configured to receive the infrared radiation from the object after passage through the optical element and to generate a measurement signal from/based on the received infrared radiation. It should be noted that each infrared detector may generate a respective measurement signal according to its characteristic parameter(s), such as a gain/sensitivity and/or an offset value, for example.

The system may also comprise a processing unit. The processing unit may be or may comprise, for example, a processor, microcontroller, or any other suitable processing device for executing instructions (e.g., software instructions) and processing data (e.g., measurement data, temperature data, image data, etc.) stored in a memory. The processing unit may be coupled to the infrared sensing module and may be configured to convert the measurement signals (i.e., signals generated by the infrared detectors) into temperature data associated with the object, for providing the infrared image. That is, the temperature data as converted from the measurement signals may represent a temperature (or temperature profile) of the object measured by the infrared detectors that have received the infrared radiation of the object. The processing unit may further convert the temperature data into the infrared (IR) image of the object to visually show a temperature distribution of the object. Accordingly, the infrared image may comprise an array of pixels and each of the plurality of infrared detectors may correspond to a single pixel of the array.

Moreover, the system may comprise a shutter assembly disposed between the infrared sensing module and the optical element. The shutter assembly may be configured to selectively pass the infrared radiation from the object through to the infrared sensing module. Specifically, the shutter assembly may be put in an open state to allow the infrared radiation from the object to pass through to the infrared sensing module, or the shutter assembly may be put in a closed state to block the infrared radiation of the object from reaching the infrared sensing module. Also, the shutter assembly may comprise a temperature controller configured to adjust/control a temperature of the shutter assembly.

Accordingly, the shutter assembly itself may, when it is in the closed state, act as a radiation source having a temperature that is adjustable/controllable. In this case (i.e., in the closed state), the infrared sensing module may receive infrared radiation from the shutter assembly and each detector of the infrared sensing module may produce a corresponding measurement signal at a given/preset temperature of the shutter assembly (i.e., a certain temperature that the shutter assembly has achieved after adjustment by the temperature controller). The respective measurement signals corresponding to the given temperature of the shutter assembly may then be converted into corresponding temperature data (and possibly also a corresponding IR image) that may represent a temperature profile of the shutter assembly as measured by the infrared sensing module when the shutter assembly is operating at the given temperature.

It is to be noted that since the shutter assembly may be placed directly in front of the infrared sensing module (i.e., detector) without optics (optical element), the shutter assembly may be assumed to be perceived a homogeneous temperature surface, rather than to accurately map a temperature curve of the shutter assembly with the detector.

Configured as above, the proposed system allows temperature measurements of the shutter assembly (e.g., acting as a radiation source when being in the closed state) by the infrared sensing module to be performed at different operating temperatures. It is appreciated that the results of these measurements (e.g., a temperature profile of the shutter assembly) may be used as reference (e.g., reference temperature data) for calibrating the infrared sensing module. As mentioned above, the shutter assembly may be used as a radiation source of (perceived) homogeneous temperature. As such, the shutter assembly acts as a controllable blackbody radiation source that can be used for calibrating the infrared sensing module. Since no additional elements need to be provided for doing so, the proposed system allows for simple and accurate calibration of the infrared sensing module.

For example, the resulting temperature profile of the shutter assembly measured by the infrared sensing module (e.g., as reference temperature data) can be compared to the actual temperature of the shutter assembly (which may be obtained by a temperature sensor, for example) to estimate the measurement errors of the infrared sensing module (which may occur due to change of the property of the IR sensing module, i.e., detector, for example). The comparison may then be used to correct subsequent measurement results for objects external to the imaging system (e.g., objects placed in front of the optical element, such as the Earth surface). By conducting temperature measurements of the shutter assembly through the infrared sensing module at different operating temperatures, corresponding reference temperature data can be provided to improve precision of the calibration.

Accordingly, prior to taking a temperature measurement of an external object, measurement errors caused by the infrared sensing module can be effectively estimated/determined by providing a reference temperature profile or reference temperature data (which may then be further converted into an IR image as reference, i.e., a reference IR image) associated with the shutter assembly at a given (operating) temperature of the shutter assembly (which is controllable/adjustable). Such measurement errors may be taken into account to ensure a subsequent temperature measurement of an external object to be conducted in a more accurate manner. In other words, the proposed imaging system provides a simple calibration mechanism which allows continuous temperature measurements of an object even with just simple temperature stabilization of the infrared sensing module (e.g., IR sensor).

In some embodiments, the shutter assembly may further comprise a temperature sensor configured to measure the (actual) temperature of the shutter assembly. Moreover, the shutter assembly may further comprise a shutter blade and a heating element coupled to the shutter blade. In particular, the temperature of the shutter assembly may be adjusted by adjusting a temperature of the shutter blade using the heating element. In other words, the shutter blade may be heated up by the heating element.

In some embodiments, the temperature controller (or specifically, the heating element) may be configured to adjust the temperature of the shutter blade when the shutter blade is at an open position. It should be noted that the open position may be a position for passing the infrared radiation from the object through to the infrared sensing module. In some embodiments, the temperature sensor may be configured to measure the temperature of the shutter assembly, in particular when the shutter blade is at a closed position. It should be noted that the closed position may be a position for blocking the infrared radiation from the object.

For example, the heating element may be a flat heating element. In some embodiments, the heating element may comprise a plate (e.g., metal plate) attached to a periphery of the shutter blade to adjust the temperature of the shutter blade. The plate may comprise a plurality of heating windings, for example. This configuration may allow the shutter blade to be properly placed on a surface of the heating element for temperature adjustment when the shutter blade is at the open position. Besides, the heating element may be connected to a power source (e.g., power supply) to convert electrical energy into heat (i.e., via a heating process) to heat up the shutter blade coupled/attached thereto (and placed, for example, at the open position). At the end of the heating process, thermal equilibrium between the heating element and the shutter blade can be achieved, so that the temperature of the heating element and the temperature of the shutter blade may be substantially the same. Thereby, the temperature of the shutter blade can be brought to a desired temperature.

In some embodiments, the temperature controller may comprise a Proportional-Integral-Derivative (PID) temperature controller. The heating element may be connected to the temperature controller to adjust/raise the temperature of the shutter blade through a heating process controlled by the temperature controller. For example, the temperature controller (e.g., PID controller) may control a power input for the heating element for adjusting the temperature of the heating element (and therefore of the shutter blade) based on the temperature of the shutter assembly as measured by the temperature sensor, and possibly further based on a target temperature. Thus, the shutter blade itself may be regarded as a blackbody radiation source. In some embodiments, the temperature of the shutter blade may be uniform (or may be perceived as uniform) across the shutter blade.

In some embodiments, the shutter blade may comprise a surface of uniform and high emissivity (e.g., to provide blackbody radiation). Furthermore, the temperature of the shutter blade may be uniform across the shutter blade. To achieve this, the temperature controller may adjust/raise the temperature of the shutter blade (via the heating element) to a certain temperature at the open position and wait until the temperature (heat) is uniformly distributed over the (surface area of the) shutter blade. After the shutter blade has been uniformly heated up to the desired temperature, the shutter blade may return to the closed position for temperature measurements by the infrared sensing module and by the temperature sensor. As mentioned, control of the temperature may depend on a measurement result of the temperature sensor and/or a target temperature.

In some embodiments, the temperature sensor may be disposed on the shutter blade to measure the actual temperature of the shutter assembly (e.g., the temperature of the shutter blade that has been achieved after the temperature adjustment). It should be noted that the (actual) temperature of the shutter assembly may correspond to the temperature of the shutter blade (and also of the heating element). In some embodiments, the temperature sensor may be a standalone sensor connected to the shutter blade and/or to the heating element. Alternatively, the temperature sensor can also be an external sensor connected to the shutter assembly (e.g., connected to the shutter blade and/or to the heating element) to measure the actual temperature of the shutter assembly (which may also correspond to the temperature of the shutter blade). In this way, the temperature of the shutter assembly can be properly measured by the temperature sensor, in particular when the shutter blade is at the closed position.

In some embodiments, the processing unit may be configured to obtain reference temperature data from the measurement signals when the shutter blade is at the closed position and has the measured temperature achieved by heating and to use the obtained reference temperature data and the measured temperature for calibration. As mentioned above, the reference temperature data associated with the shutter assembly (being at the closed position) as obtained from the measurement signals generated by the IR sensor can be further converted into a reference IR image to be compared to the measured actual temperature of the shutter assembly (measured by the temperature sensor) to estimate the measurement errors of the IR sensor for the calibration.

For calibrating the IR sensor (i.e., the IR sensing module), a characteristic parameter related to the generation of the measurement signal (e.g., the offset value) for each of the plurality of infrared detectors of the IR sensing module may be determined based on the obtained reference temperature data and the measured temperature. The calibration may then be performed by compensating for (or correcting) the measurement errors of the IR sensor using the determined characteristic parameter (e.g., by subtracting the offset values from the image or by providing calibration data for doing so).

In some embodiments, the processing unit may be further configured to provide first reference temperature data from the measurement signals at a first temperature of the shutter assembly when the shutter blade is at said closed position (i.e., when the IR sensing module receives or samples IR radiation from the shutter blade), and to provide second reference temperature data from the measurement signals at a second temperature of the shutter assembly when the shutter blade is at said closed position. The first reference temperature data and the second reference temperature data may be then converted into first and second reference infrared images, respectively. In such cases, between the provision of the first reference temperature data and the second reference temperature data, the shutter blade may be at said open position and the temperature of the shutter blade may be adjusted for bringing the temperature of the shutter blade to the second temperature. It should be noted that the second temperature may therefore be higher than the first temperature of the shutter assembly.

Besides, the processing unit may be further configured to determine a characteristic parameter related to the generation of the measurement signal for each of the plurality of infrared detectors based on a comparison between the first reference temperature data and the second reference temperature data. As mentioned above, the characteristic parameter of a given infrared detector may comprise a sensitivity (gain) and/or an offset of the given infrared detector. In particular, the sensitivity of the given infrared detector may be determined further based on the first and second temperatures of the shutter assembly. For example, the sensitivity for each of the plurality of infrared detectors may be determined further based on a difference between the first and the second measured temperatures of the shutter assembly.

It should be further noted that the first reference temperature data and the second reference temperature data may be provided consecutively, substantially within a period of time that is required for bringing the temperature of the shutter blade to said second temperature. This period of time may be a short period of time when the first and second temperatures are within a normal range (e.g., from 24° C. to 38° C.), or may be a relatively long period of time (e.g., ~1 hour) when comparing to temperature data generated for the shutter assembly being in cold space (e.g., slightly above 2.7 Kelvin which may be reached by the shutter assembly when taking into account thermal radiation in the satellite and thermal connections) as reference. In the latter case, a time interval between the provision of the first reference temperature data and the second reference temperature data (i.e., a time period for which the shutter blade is at said open position) may be prolonged so as to allow the shutter blade to be heated up to have homogeneous (uniform) temperature distribution in a gradual manner (i.e., the shutter blade can reach better thermal equilibrium with the heating element).

In some embodiments, the system may further comprise an infrared filter configured to select a wavelength of the infrared radiation to be passed to the infrared sensing module. The infrared filter may be disposed between the shutter assembly and the infrared sensing module.

Configured as above, the proposed system applies two-step corrections for calibrating the measurement errors caused by the IR sensing module. Namely, by comparing (e.g., for a given temperature) the reference temperature data related to the shutter assembly obtained from the IR sensing module to the measured actual temperature of the shutter assembly (e.g., measured by the temperature sensor), the offset(s) caused by the individual detectors of the IR sensing module can be determined and the error(s) resulting from the offset(s) can be corrected accordingly. Further, by comparing two or more sets of reference temperature data generated at different (given) temperatures with the offset(s) corrected, the sensitivity of the individual detectors of the IR sensing module can be subsequently determined for further correction of the measurement results.

More specifically, the first reference temperature data may be compared to the first actual temperature for correcting/compensating offset(s) at the first temperature, and the second reference temperature data may be compared to the second actual temperature for correcting/compensating offset(s) at the second temperature. Subsequently, the difference between the corrected first and second temperature data (after compensating/correcting for offsets) together with the actual temperature difference may then be used to determine the sensitivity (gain) of the IR sensing module.

Accordingly, subsequent measurement results for external objects can be properly corrected based on the determined characteristic parameters of the IR sensing module (e.g., the offset and/or sensitivity), thereby allowing temperature measurements of external objects to be conducted in a more accurate manner. Thus, the proposed imaging system provides a simple calibration mechanism for the IR sensing module which allows continuous temperature measurements of an object (even with just simple temperature stabilization of the infrared sensing module).

It may be further appreciated that a proper thermal isolation mechanism can be incorporated between the shutter assembly and the infrared sensing module to ensure reliable calibration of the IR sensing module (i.e., so that the temperature adjustment of the shutter assembly would not have a great influence on the temperature of the IR sensor and the ambient temperature).

Another aspect of the disclosure relates to a shutter assembly for use in an infrared imaging system. The infrared imaging system may be, for example, a thermal/IR imaging system such as IR cameras, as described above. The shutter assembly may comprise a shutter blade configured to move between an open position and a closed position to selectively pass infrared radiation from an object captured by an optical element through to an infrared sensing module of the infrared imaging system. Moreover, the shutter assembly may comprise a temperature controller coupled to the shutter blade and configured to adjust a temperature of the shutter blade.

In some embodiments, the shutter assembly may further comprise a temperature sensor configured to measure the (actual) temperature of the shutter blade when the shutter blade is at the closed position. It should be noted that the closed position may be a position at which the shutter blade blocks the infrared radiation from the object. In some embodiments, the shutter assembly may further comprise a heating element (e.g., a flat heating element) coupled to the shutter blade. In particular, the temperature of the shutter blade may be adjustable using the heating element. Optionally, the heating element may comprise a metal plate attached to a periphery of the shutter blade to adjust the temperature of the shutter blade when the shutter blade is at the open position.

At the open position, the temperature of the shutter blade can be adjusted (via the heating element) to a certain temperature until the temperature (heat) is uniformly distributed over the shutter blade, i.e., until (substantially) complete thermal equilibrium between the heating element and the shutter blade is achieved. After achieving (substantially) complete thermal equilibrium, the shutter blade may return to the closed position for subsequent temperature measurements by the IR sensing module.

It should be further noted that the open position is a position at which the shutter blade allows passage of the infrared radiation from the object through to the infrared sensing module. As described above, the shutter blade may be properly placed on a surface of the (flat) heating element for temperature adjustment when the shutter blade is at the open position.

Besides, the heating element may be connected to a power source (e.g., power supply) for converting electrical energy into heat (e.g., via a heating process) to heat up the shutter blade coupled/attached thereto (and placed onto the heating element at the open position). In some embodiments, the temperature controller may comprise a Proportional-Integral-Derivative (PID) temperature controller. The heating element may also be connected to the temperature controller to adjust/raise the temperature of the shutter blade through the heating process controlled by the temperature controller.

In some embodiments, the shutter blade may comprise a surface of uniform and high emissivity. Thus, the shutter blade itself may be regarded as a blackbody radiation source. In some embodiments, the temperature of the shutter blade may be uniform across the shutter blade.

As mentioned above, the temperature controller may adjust/raise, at the open position, the temperature of the shutter blade (via the heating element) to a certain temperature and wait until the temperature (heat) is uniformly distributed over the shutter blade, i.e., until (substantially) complete thermal equilibrium between the heating element and the shutter blade is achieved. After achieving (substantially) complete thermal equilibrium, the shutter blade may return to the closed position for subsequent temperature measurements by the IR sensing module.

It should be noted that control of the temperature may depend on the measurement result of the temperature sensor. For example, the temperature controller may control a power input to the heating element for adjusting the temperature of the heating element (and therefore of the shutter blade) based on the temperature of the shutter assembly as measured by the temperature sensor. As also described above, the temperature sensor may be disposed on the shutter blade to measure the actual temperature of the shutter blade (e.g., the temperature of the shutter blade as achieved after the adjustment). It should be noted that the (actual) temperature of the shutter blade may correspond to the temperature of the heating element and may be regarded as the temperature of the shutter assembly as a whole. Alternatively, the temperature sensor may be an external sensor connected to the shutter blade or to the heating element to measure the actual temperature of the shutter blade. Hence, the temperature of the shutter blade can be properly measured by the temperature sensor when the shutter blade is at the closed position.

In some embodiments, the shutter blade may be configured to be at said closed position for providing first reference temperature data corresponding to a first temperature of the shutter blade and for providing second reference temperature data corresponding to a second temperature of the shutter blade higher than the first temperature of the shutter blade, as indicated above. Besides, between the provision of the first reference temperature data and second reference temperature data, the shutter blade may be at said open position for adjusting the temperature of the shutter blade to reach the second temperature of the shutter blade. It should be also noted that the shutter assembly may be configured to output measurements of the first and second temperatures of the shutter blade, for determining a characteristic parameter including a sensitivity (gain) and/or an offset of a given infrared detector within the infrared sensing module.

As described above, a time period for which the shutter blade is at said open position for bringing the temperature of the shutter blade to said second temperature may be a short period of time when the first and second temperatures of the shutter blade are within a normal range (e.g., from 24° C. to 38° C.), or may be a relatively long period of time (e.g., ~1 hour) when the first temperature refers to a cold temperature in (outer) space (e.g., slightly above 2.7 Kelvin which may be reached by the shutter assembly when taking into account thermal radiation in the satellite and thermal connections). In the latter case, said time period may be prolonged so as to allow the shutter blade to be heated up to have homogeneous (uniform) temperature distribution in a gradual manner (i.e., so that the shutter blade can reach a better thermal equilibrium with the heating element).

Configured as above, the proposed shutter assembly allows temperature measurements of the shutter assembly (acting as blackbody radiation source when being in the closed state) by an IR sensor to be performed at different operating temperatures. The results of the measurements (e.g., temperature data) associated with the shutter assembly may be used as reference for calibrating the IR sensor which captures the radiation of the shutter assembly, thereby allowing temperature measurements of external objects to be conducted in a more accurate manner.

Accordingly, the proposed shutter assembly provides a simple calibration mechanism which allows continuous temperature measurements of an object. In particular, the proposed calibration mechanism may be used for calibrating the change of properties of a microbolometer detector which may happen due to launch of satellites, due to radiation over time or due to changes in pixel response after the detector has looked into the sun.

A further aspect of the disclosure relates to a method for providing an infrared image of an object using an imaging system having a shutter assembly. The infrared imaging system may be, for example, a thermal/IR imaging system such as an IR camera, as described above. More specifically, the shutter assembly, which may be similar to the shutter assembly described above, may selectively pass infrared radiation from the object captured by an optical element through to an infrared sensing module (e.g., IR sensor) of the imaging system. The infrared sensing module may comprise a plurality of infrared detectors to generate, based on the received infrared radiation, a plurality of measurement signals to be converted into temperature data associated with the object for providing the infrared image. The method may comprise measuring a first temperature of the shutter assembly. The method may also comprise providing, when the shutter assembly is in a closed state for blocking the infrared radiation from the object, first reference temperature data from the measurement signals corresponding to the measured first temperature of the shutter assembly.

The method may further comprise adjusting/controlling a temperature of the shutter assembly. In addition, the method may comprise measuring a second temperature of the shutter assembly and providing, when the shutter assembly is in said closed state, second reference temperature data from the measurement signals corresponding to the measured second temperature of the shutter assembly. Besides, the method may also comprise determining a characteristic parameter related to the generation of the measurement signals for each of the plurality of infrared detectors based on the first reference temperature data and the second reference temperature data.

In some embodiments, the temperature of the shutter assembly may be adjusted when the shutter assembly is in an open state. It should be noted that the open state may allow passage of the infrared radiation from the object through to the infrared sensing module. In some embodiments, adjusting a temperature of the shutter assembly may further comprise adjusting a temperature of a shutter blade of the shutter assembly using a heating element. In some embodiments, the shutter assembly may be in said open state between the provision of the first reference temperature data and the second reference temperature data (e.g., for heating up). Besides, the temperature of the shutter blade may be adjusted for reaching the second temperature of the shutter assembly.

In some embodiments, the first reference temperature data and the second reference temperature data may be provided consecutively, substantially within a period of time that is required for bringing the temperature of the shutter blade to said second temperature. The characteristic parameter of a given infrared detector may comprise a sensitivity (gain) and/or an offset of the given infrared detector. In some embodiments, the sensitivity for the given infrared detector may be determined further based on the measured first and second temperatures of the shutter assembly (or, more generally, based on the first and second temperature data).

It should be noted that the temperature of the shutter blade may be uniform across the shutter blade. It should be further noted that each of the plurality of infrared detectors may correspond to a single pixel of the infrared image. In some embodiments, the temperature controller may comprise a Proportional-Integral-Derivative (PID) temperature controller. Optionally, the method may further comprise selecting a wavelength of the infrared radiation to be passed to the infrared sensing module, for example using an infrared filter.

Configured as above, the proposed method allows for compensating (correcting) the measurement errors of an IR sensing module by accurately determining the characteristic parameter(s) of each infrared detector within the IR sensing module, such as the sensitivity and offset values. The correction may then be performed by for example subtracting the offset values from (temperatures indicated by) the temperature data (or temperature profile) generated by the IR sensing module or from (temperatures indicated by) a corresponding IR image. This allows subsequent measurement results for an external object to be properly corrected in case of the measurement errors, thereby allowing temperature measurements to be conducted in a more accurate manner.

Accordingly, the proposed method provides an improved calibration mechanism for an IR imaging system to enable continuous temperature measurements of an object, without need for introduction of additional elements into the IR imaging system. In particular, such an improved calibration mechanism may be used for calibrating the change of properties of a microbolometer detector which may happen due to launch of satellites, due to radiation over time or due to changes in pixel response after the detector has looked into the sun.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps) are understood to likewise apply to the corresponding apparatus (and, e.g., their blocks, stages, units), and vice versa.

BRIEF DESCRIPTION OF THE SEVERAL VIEWS OF THE DRAWINGS

Embodiments of the disclosure are described below in an exemplary manner with reference to the accompanying drawings, wherein.

DETAILED DESCRIPTION

Figure 1:
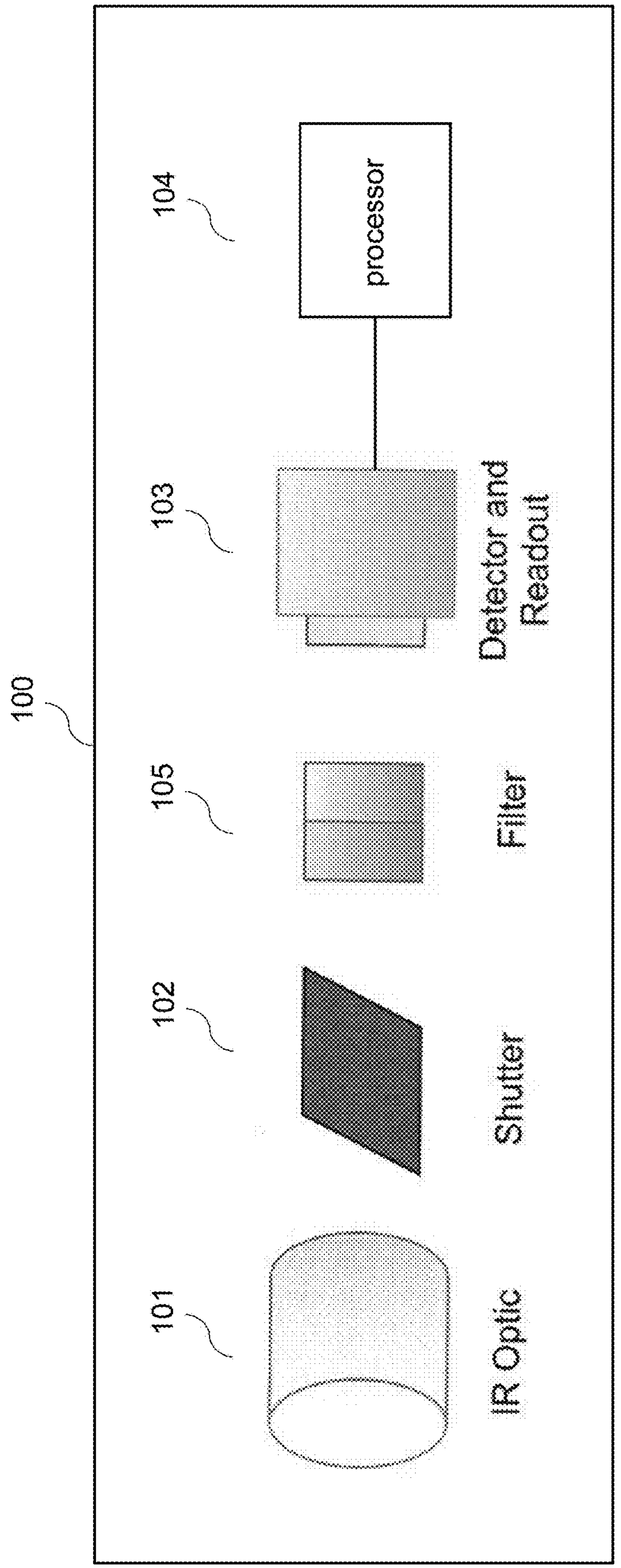
FIG. 1 illustrates an example of an infrared (IR) imaging system for providing an infrared image of an object according to an embodiment of the disclosure.

FIG. 1 illustrates an infrared (IR) imaging system 100 for providing an infrared image of an object according to an embodiment of the disclosure. The infrared imaging system 100 may be, for example, an infrared camera for installation in small satellites for space applications, for example. Herein, the IR imaging system 100 includes an optical element 101 (such as an IR optical lens, for example) to capture infrared radiation from an object (not shown) external to the IR imaging system 100. The IR imaging system 100 also includes an infrared sensing module 103 (e.g., an IR sensor) having a plurality of infrared detectors (e.g., an IR detector array or microbolometer). As mentioned above, each of the infrared detectors is configured to receive the infrared radiation from the object after passage through the optical element 101 and then generate a measurement signal from the received infrared radiation. The respective measurement signal is generated based on or in accordance with the characteristic parameter(s) for each of the detectors, such as a gain/sensitivity (e.g., information on how a given change in IR radiation translates into a corresponding change in the measurement signal) and/or an offset value (e.g., information on a magnitude of the measurement signal in the absence of IR radiation).

The IR imaging system 100 also includes a processing unit 104, such as a processor, microcontroller, or any other suitable processing device for executing instructions (e.g., software instructions) and processing data (e.g., measurement data, temperature data, image data, etc.) stored in a memory or provided to the processing unit 104 in any other suitable form. The processing unit 104 is coupled to the infrared sensing module 103 to convert the measurement signals (i.e., measurement signals generated by the infrared detectors) into temperature data associated with the object for providing an infrared (IR) image. The processing unit 104 is configured to further convert the temperature data into the IR image of the object to visually show a temperature distribution of the object. Accordingly, the infrared image may comprise an array of pixels and each of the plurality of infrared detectors may correspond to a single pixel of the array.

The IR imaging system 100 further includes a shutter assembly 102 disposed between the optical element 101 and the infrared sensing module 103. In some embodiments, the system may further comprise an infrared filter 105 configured to select a wavelength of the infrared radiation to be passed to the infrared sensing module 103. The infrared filter may be disposed between the shutter assembly 102 and the infrared sensing module 103. The shutter assembly 102 is configured to selectively pass the infrared radiation from the object through to the infrared sensing module 103. For example, the shutter assembly 102 can be put into an open state to allow the infrared radiation from the object to pass through to the infrared sensing module 103, or the shutter assembly 102 can be put into a closed state to block the infrared radiation of the object from reaching the infrared sensing module 103. Also, the shutter assembly 102 may comprise a temperature controller (not shown) to adjust or control a temperature of the shutter assembly 102.

As mentioned above, the shutter assembly 102 itself may act as a radiation source having a temperature that is adjustable/controllable, when the shutter assembly 102 is in the closed state. In this case, the infrared sensing module 103 receives infrared radiation from the shutter assembly 102 (i.e., samples IR radiation from the (closed) shutter assembly 102) and each detector of the infrared sensing module 103 will then produce a corresponding measurement signal at a given/preset temperature of the shutter assembly 102 (i.e., a measurement signal corresponding to the given/preset temperature of the shutter assembly 102). The respective measurement signals corresponding to the given temperature of the shutter assembly 102 will then be converted into corresponding temperature data (and possibly also an IR image) representing a temperature profile of the shutter assembly 102 as measured by the infrared sensing module 103.

As described above, the processing unit 104 is configured to obtain reference temperature data from the measurement signals when the shutter assembly 102 is in the closed state and has the measured temperature achieved through the adjustment by the temperature controller, and configured to use the obtained reference temperature data and the measured temperature for calibration. The reference temperature data associated with the shutter assembly 102 being at the closed position as obtained from the measurement signals generated by the IR sensor 103 can be further converted into a reference IR image to be compared to the measured actual temperature of the shutter assembly 102 (measured by a temperature sensor, not shown) to estimate the measurement errors of the IR sensor 103 for the calibration. Alternatively, the reference temperature data may be directly compared to the measured actual temperature of the shutter assembly 102 to estimate the measurement errors of the IR sensor 103 for the calibration.

The processing unit 104 is further configured to provide two or more sets of temperature data as reference for the calibration. For example, first reference temperature data from the measurement signals at a first temperature of the shutter assembly 102 may be provided when the shutter assembly 102 is in said closed state, and second reference temperature data from the measurement signals at a second temperature of the shutter assembly 102 may be provided when the shutter assembly 102 is in said closed state. Between the provision of the first reference temperature data and the second reference temperature data, the shutter assembly 102 may be in said open state and the temperature of the shutter assembly 102 may be adjusted for bringing the temperature of the shutter assembly 102 to the second temperature.

Figure 2:
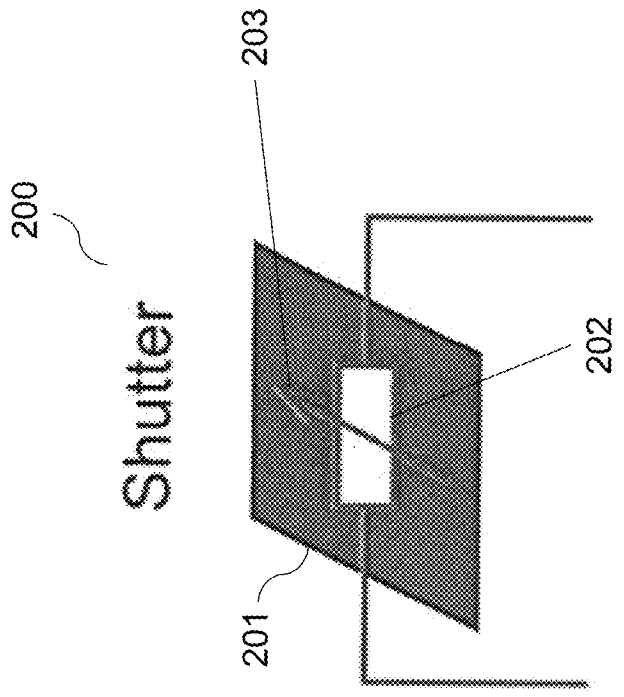
FIG. 2 illustrates an example of a shutter assembly for use in the infrared imaging system according to an embodiment of the disclosure.

FIG. 2 illustrates a shutter assembly 200 for use in the infrared imaging system 100 according to an embodiment of the disclosure. The shutter assembly 200 corresponds to the shutter assembly 102 of the infrared imaging system 100 in FIG. 1, and includes a shutter blade 201 which can move between an open position and a closed position to selectively pass infrared radiation from an object captured by the optical element 101 through to the infrared sensing module 103 of the infrared imaging system 100. The shutter assembly 200 also includes a temperature controller (e.g., a PID controller, not shown) for adjusting a temperature of the shutter blade 201. The shutter assembly 200 further includes a heating element 202 (e.g., a flat heating element) coupled to the shutter blade 201, so that the temperature controller can adjust the temperature of the shutter blade using the heating element 202. The heating element 202 may contain a variable resistance 203. Besides, the shutter assembly 200 can also have one or more temperature sensors (not shown) to measure the actual temperature of the shutter assembly 200 or the shutter blade 201.

As mentioned above, the heating element 202 can be connected to a power source (e.g., power supply) to convert electrical energy into heat (e.g., via a heating process) to heat up the shutter blade 201. The heating element 202 is also connected to the temperature controller for adjusting/raising the temperature of the shutter blade 201 through the heating process controlled by the temperature controller. It should be noted that the shutter blade 201 has a surface of uniform and high emissivity and can be regarded as a blackbody radiation source. In addition, the temperature of the shutter blade 201 may be uniform across the shutter blade 201.

Figure 3:
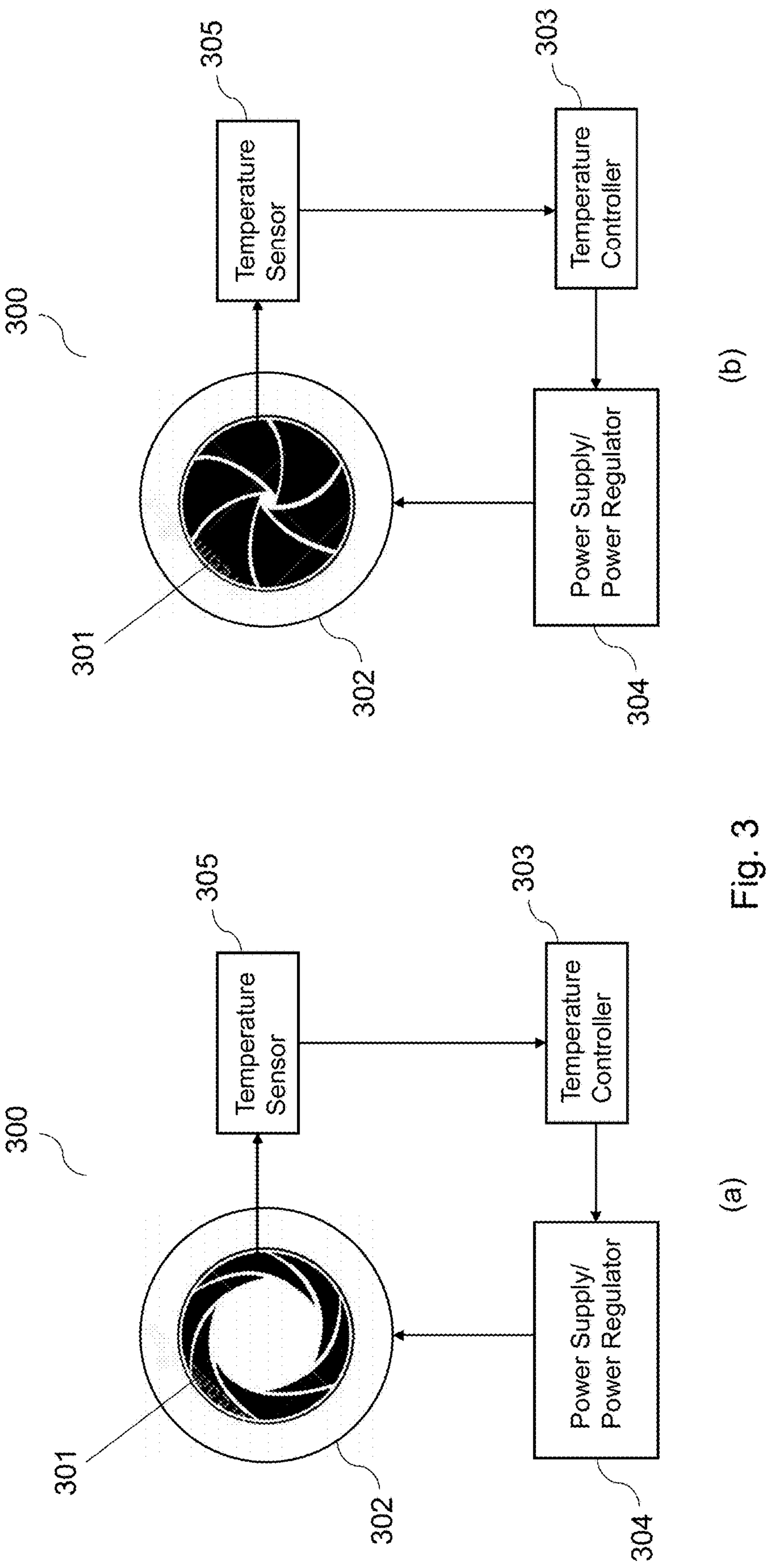
FIG. 3 illustrates a detailed view of the shutter assembly of FIG. 2 when the shutter assembly is at an open position (a) and when the shutter assembly is at a closed position (b) according to an embodiment of the disclosure.

FIG. 3 illustrates a detailed view of the shutter assembly 200 in FIG. 2 according to an embodiment of the disclosure. The shutter assembly 300 includes a shutter blade 301 that moves between an open position (a) and a closed position (b) to selectively pass infrared radiation from an external object. The shutter assembly 300 further includes a flat heating element 302 coupled to the shutter blade 301 for adjusting the temperature of the shutter blade 301. The flat heating element 302 can be made from a metal plate or a flat wire winding pattern attached to a periphery of the shutter blade 301. As shown in the example of FIG. 3, both the shutter blade 301 and the heating element 302 are circular plates having a common center (i.e., being concentric). However, any other shape of plates may also be feasible in the context of the present disclosure.

According to the configuration as shown in FIG. 3, the circular plate of the shutter blade 301 is placed within a concentric inner hole of the circular plate of the heating element 302, where the periphery of the shutter blade 301 is attached to the periphery of the inner hole of the heating element 302. The shutter blade 301 can move towards its periphery to be at the open position (as illustrated by FIG. 3(*a*)) at which the shutter blade 301 allows passage of the infrared radiation of the object through to the infrared sensing module 103, while the shutter blade 301 can move towards its center to be at the closed position (as illustrated by FIG. 3(*b*)) at which the shutter blade 301 blocks the infrared radiation of the object. Accordingly, the shutter blade 301 can be properly placed on a surface of the flat heating element 302 to have good physical contact with the heating element 302 for heat exchange and temperature adjustment when the shutter blade 301 is at the open position.

In the embodiment, the heating element 302 is connected to a power source (e.g., power supply or power regulator) 304 for converting electrical energy into heat (e.g., via a heating process) to heat up the shutter blade 301 when the shutter blade 301 is at the open position (a). At the end of the heating process, thermal equilibrium between the heating element 302 and the shutter blade 301 can be achieved, so that the temperature of the heating element 302 and the temperature of the shutter blade 301 become substantially the same. Preferably, the shutter blade 301 may be a uniform and thin plate so as to shorten the required time for reaching the thermal equilibrium. The shutter blade 301 may also have high emissivity to serve as a blackbody radiation source when being in the closed state.

Furthermore, a temperature controller 303 (e.g., PID controller) is connected to the power supply 304 for controlling a power input for the heating element 302 and for adjusting the temperature of the shutter blade 301. Additionally, one or more temperature sensors 305 may be coupled (e.g., connected) to the shutter blade 301 (or alternatively, disposed on the shutter blade) to measure the actual temperature of the shutter blade 301, in particular when the shutter blade 301 is at the closed position. Notably, the temperature sensor(s) 305 may be also coupled (e.g., connected) to the temperature controller 303 so that the temperature controller 303 can controls the temperature adjustment based on the temperature of the shutter assembly 301 as measured by the temperature sensor(s) 305.

Figure 4:
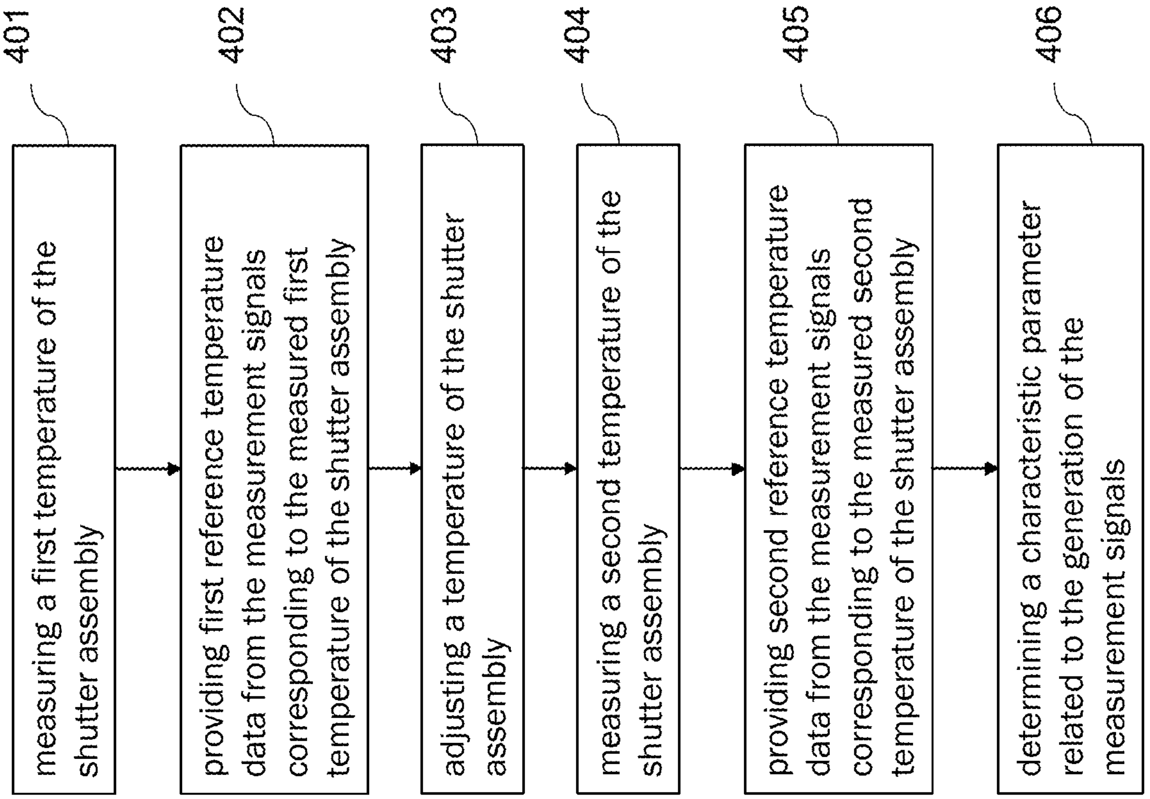
FIG. 4 illustrates processing steps for an example of a method for providing an infrared image of an object using the imaging system having the shutter assembly according to an embodiment of the disclosure.

FIG. 4 illustrates a method for providing an infrared image of an object using the imaging system 100 having the shutter assembly 200, 300, according to an embodiment of the disclosure. The method 400 includes measuring a first temperature of the shutter assembly (step 401) and providing, when the shutter assembly is in a closed state for blocking the infrared radiation from the object, first reference temperature data from the measurement signals corresponding to the measured first temperature of the shutter assembly (step 402).

The method 400 further includes adjusting/controlling a temperature of the shutter assembly (step 403). The method also includes measuring a second temperature of the shutter assembly (step 404) and providing, when the shutter assembly is in said closed state, second reference temperature data from the measurement signals corresponding to the measured second temperature of the shutter assembly (step 405). Moreover, the method includes determining a characteristic parameter related to the generation of the measurement signals for each of the plurality of infrared detectors based on the first reference temperature data and the second reference temperature data (step 406).

Configured as above, temperature measurements of the shutter assembly (acting as a radiation source when being in the closed state) can be easily performed to provide reference temperature data at different operating temperatures. It is appreciated that the results of the measurements (e.g., the temperature data of the shutter assembly) may be used as reference (e.g., reference temperature data) for calibrating the infrared sensing module (e.g., IR sensor). As noted above, since the shutter assembly may be placed directly in front of the infrared sensing detector without optics, the shutter assembly may be assumed to be a homogeneous temperature surface, rather than to accurately map a temperature curve of the shutter assembly with the detector.

For example, the resulting temperature profile of the shutter assembly measured or observed by the infrared sensing module (e.g., as reference temperature data) can be compared to the actual temperature of the shutter assembly (which may be obtained by for example a temperature sensor) to estimate the measurement errors of the infrared sensing module (which may occur for example due to changes of ambient temperature). The comparison may then be used to correct subsequent measurement results for objects external to the imaging system (e.g., objects placed in front of the optical element, such as the Earth surface).

Accordingly, prior to taking a temperature measurement of an external object, measurement errors caused by the infrared sensing module can be effectively and efficiently estimated/determined by providing a reference temperature profile or reference temperature data (which may then be further converted into an IR image as reference, i.e., a reference IR image) at one or more given (operating) temperatures of the shutter assembly (where the temperature is controllable/adjustable). Such measurement errors may be taken into account to ensure a subsequent temperature measurement of an external object to be conducted in a more accurate (and reliable) manner.

In other words, the proposed method and imaging system provides a simple and improved calibration mechanism that allows continuous temperature measurements of an object even with just simple temperature stabilization of the infrared sensing module. In particular, the proposed calibration mechanism may be used for calibrating the change of properties of a microbolometer detector which may happen due to launch of satellites, due to radiation over time or due to changes in pixel response after the detector has looked into the sun.

It should be further noted that the description and drawings merely illustrate the principles of the proposed device. Those skilled in the art will be able to implement various arrangements that, although not explicitly described or shown herein, embody the principles of the present disclosure and are included within its spirit and scope. Furthermore, all examples and embodiments outlined in the present document are principally intended expressly to be only for explanatory purposes to help the reader in understanding the principles of the proposed device. Furthermore, all statements herein providing principles, aspects, and embodiments of the present disclosure, as well as specific examples thereof, are intended to encompass equivalents thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An infrared imaging system for providing an infrared image of an object, the infrared image system comprising:
- an optical element configured to capture infrared radiation from the object;
- an infrared sensing module comprising a plurality of infrared detectors, each infrared detector configured to receive the infrared radiation from the object after passage through the optical element and generate a measurement signal from the received infrared radiation;
- a processing unit coupled to the infrared sensing module and configured to convert measurement signals into temperature data associated with the object for providing the infrared image; and
- a shutter assembly disposed between the infrared sensing module and the optical element and configured to selectively pass the infrared radiation from the object through to the infrared sensing module, the shutter assembly comprising a temperature controller configured to adjust a temperature of the shutter assembly.

2. The infrared imaging system of claim 1, wherein the shutter assembly further comprises a temperature sensor configured to measure the temperature of the shutter assembly.

3. The infrared imaging system of claim 2, wherein the shutter assembly further comprises a shutter blade and a heating element coupled to the shutter blade, and
- wherein the temperature controller is further configured to adjust the temperature of the shutter assembly by adjusting a temperature of the shutter blade using the heating element.

4. The infrared imaging system of claim 3, wherein the temperature controller is configured to adjust the temperature of the shutter blade when the shutter blade is at an open position, and
- wherein the open position is a position at which the shutter blade allows a passage of the infrared radiation from the object through to the infrared sensing module.

5. The infrared imaging system of claim 3, wherein the temperature sensor is configured to measure the temperature of the shutter assembly when the shutter blade is at a closed position, wherein the closed position is a position at which the shutter blade blocks the infrared radiation from the object.

6. The infrared imaging system of claim 5, wherein the processing unit is further configured to obtain reference temperature data from the measurement signals when the shutter blade is at the closed position and has the measured temperature achieved by heating the shutter blade with the heating element, and to use the obtained reference temperature data and the measured temperature for a calibration.

7. The infrared imaging system of claim 5, wherein the processing unit is further configured to provide first reference temperature data from the measurement signals at a first temperature of the shutter assembly when the shutter blade is at the closed position, and to provide second reference temperature data from the measurement signals at a second temperature of the shutter assembly when the shutter blade is at the closed position.

8. The infrared imaging system of claim 7, wherein the temperature controller is further configured to adjust the temperature of the shutter blade when the shutter blade is at an open position,
- wherein the open position is a position at which the shutter blade allows a passage of the infrared radiation from the object through to the infrared sensing module,
- wherein between a provision of the first reference temperature data and the second reference temperature data, the shutter blade is at the open position, and
- wherein the temperature controller is further configured to adjust the temperature of the shutter blade for bringing the temperature of the shutter blade to the second temperature.

9. The infrared imaging system of claim 7, wherein the first reference temperature data and the second reference temperature data are provided consecutively, substantially within a period of time that is required for bringing the temperature of the shutter blade to the second temperature.

10. The infrared imaging system of claim 7, wherein the processing unit is further configured to determine a characteristic parameter related to a generation of the measurement signal for each infrared detector of the plurality of infrared detectors based on a comparison between the first reference temperature data and the second reference temperature data.

11. The infrared imaging system of claim 10, wherein the characteristic parameter of a given infrared detector of the plurality of infrared detectors comprises a sensitivity and/or an offset of the given infrared detector.

12. The infrared imaging system of claim 11, wherein the processing unit is configured to determine the sensitivity of the given infrared detector based on the first temperature and the second temperature of the shutter assembly.

13. The infrared imaging system of claim 3, wherein the shutter blade comprises a surface of a uniform and high emissivity.

14. The infrared imaging system of claim 3, wherein the temperature controller is configured to adjust the temperature of the shutter blade using the heating element such that the temperature of the shutter blade is uniform across the shutter blade.

15. The infrared imaging system of claim 1, wherein the infrared image comprises an array of pixels, and each infrared detector of the plurality of infrared detectors corresponds to a single pixel of the array of pixels.

16. The infrared imaging system of claim 1, wherein the temperature controller comprises a Proportional-Integral-Derivative (PID) temperature controller.

17. The infrared imaging system of claim 1, further comprising an infrared filter configured to select a wavelength of the infrared radiation to be passed to the infrared sensing module.

18. A shutter assembly for use in an infrared imaging system comprising an optical element and an infrared sensing module, the shutter assembly comprising:

a shutter blade configured to move between an open position and a closed position to selectively pass infrared radiation from an object captured by the optical element through to the infrared sensing module; and a temperature controller coupled to the shutter blade and configured to adjust a temperature of the shutter blade.

19. The shutter assembly of claim 18, further comprising a temperature sensor configured to measure the temperature of the shutter blade when the shutter blade is at the closed position, wherein the closed position is a position at which the shutter blade blocks the infrared radiation from the object.

20. The shutter assembly of claim 18, further comprising a heating element coupled to the shutter blade, wherein the heating element is configured to adjust the temperature of the shutter blade.

21. The shutter assembly of claim 20, wherein the heating element comprises a metal plate attached to a periphery of the shutter blade to adjust the temperature of the shutter blade when the shutter blade is at the open position, and wherein the open position is a position at which the shutter blade allows a passage of the infrared radiation from the object through to the infrared sensing module.

22. The shutter assembly of claim 21, wherein the shutter blade is configured to be at the closed position for providing first reference temperature data corresponding to a first temperature of the shutter blade and for providing second reference temperature data corresponding to a second temperature of the shutter blade higher than the first temperature of the shutter blade, and wherein, between a provision of the first reference temperature data and second reference temperature data, the shutter blade is at the open position for adjusting the temperature of the shutter blade to reach the second temperature of the shutter blade.

23. The shutter assembly of claim 22, wherein the shutter assembly is configured to output measurements of the first temperature and the second temperature of the shutter blade, for determining a characteristic parameter including a sensitivity and/or an offset of a given infrared detector within the infrared sensing module.

24. The shutter assembly of claim 18, wherein the shutter blade comprises a surface of a uniform and high emissivity.

25. The shutter assembly of claim 18, wherein the temperature controller is configured to adjust the temperature of the shutter blade such that the temperature of the shutter blade is uniform across the shutter blade.

26. The shutter assembly of claim 18, wherein the temperature controller comprises a Proportional-Integral-Derivative (PID) temperature controller.

27. A method for providing an infrared image of an object using an infrared imaging system having a shutter assembly according to claim 18, the method comprising:

measuring a first temperature of the shutter assembly, the shutter assembly selectively passing infrared radiation from the object captured by the optical element through to the infrared sensing module of the infrared imaging system, the infrared sensing module comprising a plurality of infrared detectors to generate, based on the passed infrared radiation, a plurality of measurement signals to be converted into temperature data associated with the object for providing the infrared image;

providing, when the shutter assembly is in the closed position for blocking the infrared radiation from the object, first reference temperature data from the plurality of measurement signals corresponding to the measured first temperature of the shutter assembly;

adjusting a temperature of the shutter assembly;

measuring a second temperature of the shutter assembly;

providing, when the shutter assembly is in the closed position for blocking the infrared radiation from the object, second reference temperature data from the plurality of measurement signals corresponding to the measured second temperature of the shutter assembly; and determining a characteristic parameter related to a generation of the plurality of measurement signals for each infrared detector of the plurality of infrared detectors based on the first reference temperature data and the second reference temperature data.

28. The method of claim 27, wherein the temperature of the shutter assembly is adjusted when the shutter assembly is in the open position, and wherein the open position is a position in which the shutter assembly allows a passage of the infrared radiation from the object through to the infrared sensing module.

29. The method of claim 27, wherein adjusting a temperature of the shutter assembly further comprises adjusting a temperature of a shutter blade of the shutter assembly using a heating element.

30. The method of claim 29, wherein the temperature of the shutter assembly is adjusted when the shutter assembly is in the open position, wherein the open position is a position in which the shutter assembly allows a passage of the infrared radiation from the object through to the infrared sensing module, and wherein the shutter assembly is in the open position between a provision of the first reference temperature data and the second reference temperature data, and the temperature of the shutter blade is adjusted for reaching the second temperature of the shutter assembly.

31. The method of claim 29, wherein the first reference temperature data and the second reference temperature data are provided consecutively, substantially within a period of time that is required for bringing the temperature of the shutter blade to the second temperature.

32. The method of claim 29, wherein the temperature of the shutter blade is adjusted such that the temperature of the shutter blade is uniform across the shutter blade.

33. The method of claim 27, wherein the characteristic parameter of a given infrared detector of the plurality of infrared detectors comprises a sensitivity and/or an offset of the given infrared detector.

34. The method of claim 33, wherein the sensitivity for the given infrared detector is determined further based on the measured first temperature and the measured second temperature of the shutter assembly.

35. The method of claim 27, wherein each infrared detector of the plurality of infrared detectors corresponds to a single pixel of the infrared image.

36. The method of claim 27, wherein the temperature controller comprises a Proportional-Integral-Derivative (PID) temperature controller.

37. The method of claim 27, further comprising selecting a wavelength of the infrared radiation to be passed to the infrared sensing module using an infrared filter.

* * * * *